United States Patent [19]

Greppmair et al.

[11] 4,294,136

[45] Oct. 13, 1981

[54] CRANK GEAR WITH ADJUSTABLE CRANK RADIUS FOR MOTOR DRIVEN WORKING IMPLEMENTS

[75] Inventors: Martin Greppmair, München-Lerchenau; Wittloff Grünwald, Pielenhofen, both of Fed. Rep. of Germany

[73] Assignee: Wacker Werke GmbH & Co. KG, Munich, Fed. Rep. of Germany

[21] Appl. No.: 485

[22] Filed: Jan. 2, 1979

[30] Foreign Application Priority Data

Dec. 30, 1977 [DE] Fed. Rep. of Germany ....... 2758989

[51] Int. Cl.³ .............................................. F16C 3/04
[52] U.S. Cl. ..................................................... 74/600
[58] Field of Search ..................... 74/600, 117, 571 R, 74/571 L, 571 M

[56] References Cited

U.S. PATENT DOCUMENTS

| | | | |
|---|---|---|---|
| 421,297 | 2/1890 | Mills | 74/600 |
| 1,565,820 | 12/1925 | Saunders | 74/571 |

*Primary Examiner*—Kenneth Dorner
*Attorney, Agent, or Firm*—Becker & Becker, Inc.

[57] ABSTRACT

A crank gear with adjustable crank radius for motor driven beating working implements, especially tamping implements, jack hammers, hammer drills and the like, in which the crank pin for the connecting rod is eccentrically arranged with regard to the crank shaft axis and when being adjusted moves in a circular path which is substantially parallel to its plane of circulation and is eccentric with regard to the crank shaft axis. That end of the crank shaft which faces the connecting rod is a crank disc. The crank pin is eccentrically arranged on a clamping or coupling disc which with regard to the crank shaft axis eccentrically engages that end face of the crank disc which faces toward the crank pin. The clamping disc, when in disengaging position, is rotatable from the outside of the crank gear relative to the crank disc and is adapted in a selected operative position to be arrested relative to the crank disc, by means of a tension force pressing the clamping disc against the crank disc.

9 Claims, 2 Drawing Figures

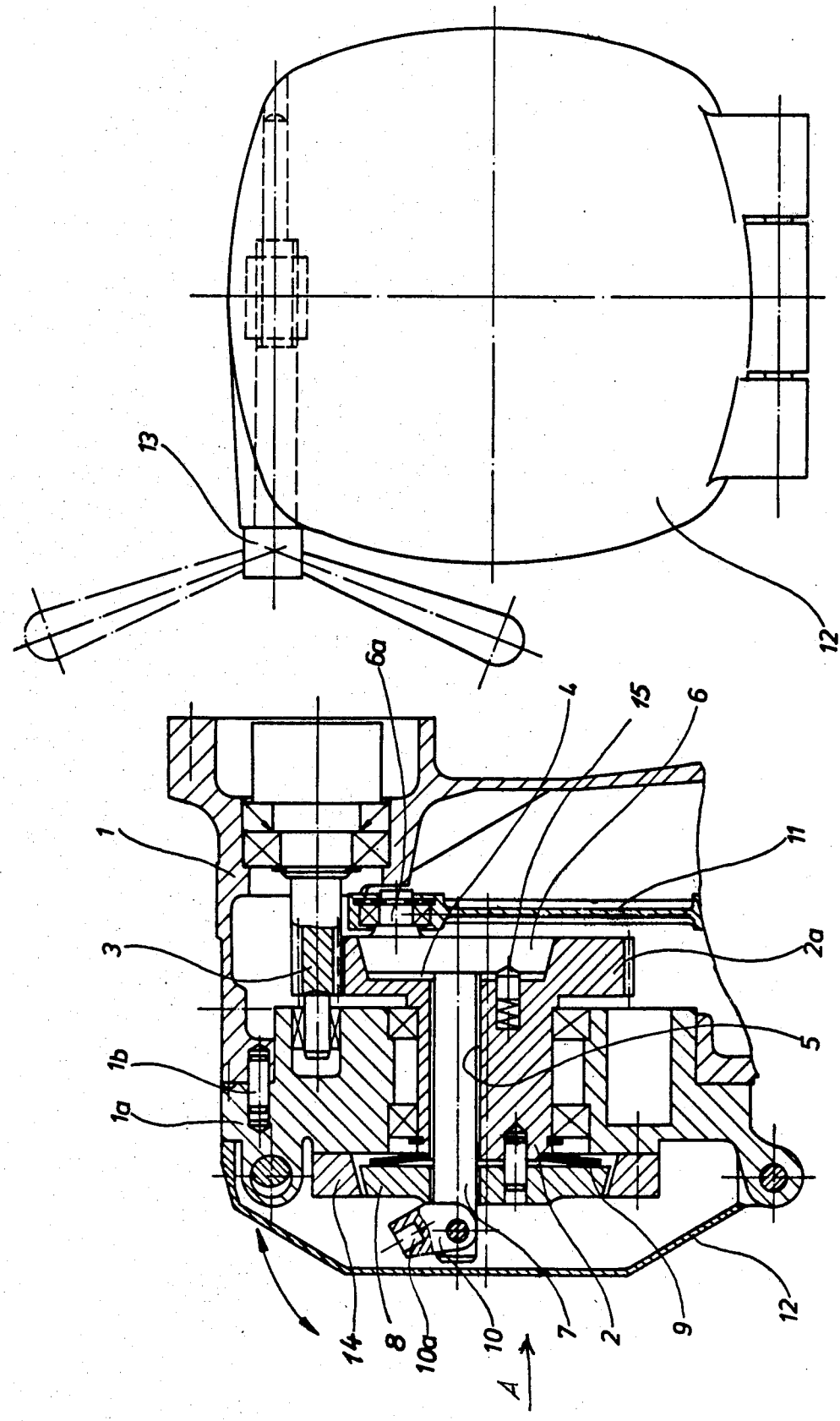

CRANK GEAR WITH ADJUSTABLE CRANK RADIUS FOR MOTOR DRIVEN WORKING IMPLEMENTS

The present invention relates to a crank gear with an adjustable crank radius for motor driven beating working implements, jack hammers, hammer drills and the like. The crank pin for the connecting rod is eccentrically located with regard to the crank shaft axis and moves during its adjustment on a circular path which is parallel to its circulating plane and is eccentric to the crank shaft axis.

With a heretofore known embodiment of an implement of the above mentioned type, the crank pin is arranged on a gear which is located tooth-parallel to a crank disc at the end of the crank shaft and which is turnable by means of a pinion about an axis of rotation which is eccentrically arranged relative to the crank shaft axis. The said pinion is located at one end of an adjusting shaft which coaxially extends through the crank shaft. During the rotation of the gear, the crank pin arranged in spaced relationship to the axis of rotation of the gear changes its distance from the longitudinal aixs of the crank shaft.

Designs of the above mentioned known type do not stand the rough operation to which working elements of the above mentioned general type are exposed so that this way of changing the crank radius for an optimum adaptation of the output to the respective prevailing conditions of operation could not be adopted in practice.

It is, therefore, an object of the present invention to provide a crank drive of the above mentioned general type which in spite of a simple construction excells over the heretofore known structure of the implement involved and does so while being considerably less liable to disorders and having a considerably greater lifespan.

These and other objects and advantages of the invention will appear more clearly from the following specification in connection with the accompanying drawings, in which:

FIG. 1 illustrates a longitudinal section through the crank drive according to the present invention.

FIG. 2 is a side view of the implement of FIG. 1 as seen in the direction of the arrow A.

The implement according to the present invention is characterized primarily in that that end of the crank shaft which faces the connecting rod is in a manner known per se designed as a crank disc while the crank pin is eccentrically arranged on a clamping or coupling disc which with regard to the crank shaft axis eccentrically engages that end face of the crank disc which faces the crank pin and from the outside of the crank drive is in disengaged condition rotatable relative to the crank disc and in the selected position of operation is arrestable relative to the crank disc by a clamping force which presses the clamping or coupling disc against the crank disc.

In contrast to the heretofore known design, with the implement according to the invention, the adjusting member, namely the clamping disc moving said crank pin during the adjustment on a circular path is for operation of the crank disc clamped directly and is disengaged therefrom only for purposes of adjustment. In clamped-in condition, the parts cannot carry out any relative movements with regard to each other which parts otherwise similar to those of the heretofore known designs in the rough operation of the working element with which the crank drive according to the invention is employed, are unavoidable and lead to a regular noisy operation, to increased wear, and to a greatly decreased lifespan.

According to a preferred embodiment of the invention, it is provided that the crank disc comprises in that end face which faces the crank pin a depression which is eccentric to the crank shaft axis. The clamping disc, as to shape and size fits into the said depression. This embodiment, already with a relatively low clamping force acting upon the clamping disc will assure a strong clamping action between the clamping disc and the crank disc which also offers complete freedom of play in a particularly simple manner.

According to another preferred embodiment of the invention, the clamping disc may during the adjustment be arrestable in different positions.

According to a further development of the invention, it is provided that the clamping disc includes an adjusting and clamping axle which is coaxial to said clamping disc and extends axially through the crank disc and the crank shaft. The said adjusting and clamping axle will after loosening a protective cover accessible from the outside project from the crank drive. By means of this adjusting and clamping axle, the desired adjustment of the distance between the crank pin and the longitudinal axis of the crank shaft can be effected from the outside in a particularly simple manner.

By means of the above mentioned adjusting and clamping axle, it is also possible to transfer the clamping force effective between the chucking disc and the crank disc, when according to a further development of the invention, the adjusting and clamping axle at its accessible end includes a clamping cam pivotally mounted on said adjusting and clamping axle. The said clamping cam is adapted to be braced relative to a spring cushioned pressure disc arranged between said clamping cam and the crank disc. The clamping of the clamping cam requires a relatively high force which cannot be furnished without a tool unless the clamping cam is provided with a clamping lever. In order to make sure that this clamping lever does not form an interfering bulky structural element, it is suggested according to a further development of the invention, that the protective cover is held in its operative position by means of a toggle bolt detachable from said protective cover, said toggle bolt being adapted to be connected as clamping lever to the clamping cam. The lifespan of the adjustable crank drive according to the invention may be further increased by so designing the crank drive that undue shocks caused by breakage of springs or in the form of block shocks which occur when the springs of the subsequent spring oscillating system are pressed together beyond their spring capacity, are to a major extent kept away from said spring oscillating system.

According to a further development of the invention, this can be realized by the crank drive according to the invention in a simple manner. More specifically, the depression and the clamping or coupling disc have smooth circumferential surfaces, and the spring force between crank disc and pressure disc is in tensioned condition of the clamping cam, so great that the clamping disc, when exceeding a predetermined counterforce, on said crank pin, will, in view of vibration shocks or the like, slip through with regard to the crank disc. The hard blows are particularly dangerous when the crank pin is set for a major distance from the crank shaft longitudinal axis. In such an instance, the slipping through brings about that in this connection the crank pin positively approaches the crank shaft longitudinal axis so that also in this way a less critical condition is encountered.

When on the other hand, a particularly torsion-resistant clamping is desired between the clamping disc and the crank disc, this may be relized according to another embodiment of the invention by teeth, ribs, or the like which become effective in the clamped condition of the clamping cam, for establishing a frictional connection between the clamping disc and said depression.

Referring now to the drawing in detail, FIG. 1 shows only that portion of the working implement in which those parts are mounted which are important for the invention. This part is designated with the reference numeral 1 and will be designated as implement housing. For the observer of FIG. 1, from the left hand side there is inserted into housing 1 a crank drive holder or insert 1a which by means of a bolt 1b is non-rotatably connected to said implement housing.

In the implement housing 1 and the insert 1a, there are mounted in anti-friction bearings the crank shaft 2 and a motor driven pinion 3 for the crank drive. The axes of said crank shaft 2 and pinion 3 are parallel to and offset relative to each other. The crank shaft 2 has that end thereof which in the drawing is located on the right hand side provided with a crank disc 2a which is designed as a spur gear and which at its circumference meshes with the driving pinion 3. On the right hand side of crank disc 2a (with regard to FIG. 1), crank disc 2a has a truncated cone-shaped depression 4 widening toward the outside. The center of this depression is eccentric with regard to the longitudinal axis of the crank shaft.

The crank shaft 2 has a bore 5 which is axis-parallel to the crank shaft 2 and is coaxial with regard to the depression 4 and thus is eccentric with regard to the longitudinal axis of the crank shaft. Inserted into the depression 4 is a clamping disc or rotatable member 6 which according to shape and magnitude fits into said depression 4. From said clamping disc 6 through the longitudinal bore 5 in the crank shaft 2 there extends an adjusting and clamping axle 7. This adjusting and clamping axle 7 is longer than the crank shaft 2 and at that end thereof which projects from said crank shaft 2 is provided with a pressure plate 8 which is axially slidable on crank shaft 2. Between the pressure plate 8 and that end face of crank shaft 2 which faces said pressure plate 8 there is inserted a dish spring 9 which tends to press the pressure plate 8 away from the crank shaft 2. The pressure plate 8 on the adjusting and clamping axle 7 is by means of a self-locking clamping cam 10 adjustable in the direction toward the crank disc 2a, when the clamping cam 10 is moved from a disengaging position into the clamping position shown in FIG. 1. As a result thereof, a clamping force acting upon the clamping disc 6 is generated which tends to pull the clamping force into the depression 4 in the crank disc 2a so that on the circumferential side, depending on the design of the surfaces contacting each other, a power or frictional connection is established. In the clamping condition of the cam 10, thus the clamping disc 6 is at least up to a magnitude sufficient for the normal operation of the forces to be conveyed through the connecting rod 11, non-rotatably held relative to the crank disc 2a. If, however, the clamping cam 10 is pivoted in counterclockwise direction relative to its position shown in FIG. 1, the pressure plate 8 can, with regard to the drawing, move toward the left on the adjusting and clamping axle 7 whereby the force derived from the spring 9 and previously acting upon the clamping disc 6 is no longer effective so that also the circumferential connection between disc 6 and crank disc 2a no longer exists. In this condition, it is possible to set the clamping disc 6 with the crank pin 6a eccentrically arranged thereon, by turning the adjusting and clamping axle 7 with the lid or cover 12 folded off, at will into the desired distance from the longitudinal axis of the crank shaft, and subsequently to arrest the clamping disc 6 by again clamping the cam 10 relative to the clamping disc 2a.

For holding the cover or lid 12 in its folded-up position on the member 1a, there is provided a toggle bolt 13 which in loosened condition of the cover 12 is removable therefrom and then in the form of a lever can be inserted into a blind bore provided in the cam 10. In this way, the toggle bolt 13 forms the clamping tool for the cam 10 and is ready for operation at any time when the cover is folded down in order to establish access to the crank gear.

With the illustrated embodiment, the depression 4 and the clamping disc 6 have circumferentially smooth surfaces so that frictional connection exists therebetween. The magnitude of the frictional connecting force depends on the dimensions of the spring 9 which can be so selected that while through the crank pin forces are transmitted as they are necessary for normal operation, without the clamping disc 6 being able to turn relative to the crank disc 2a, the last mentioned parts will nevertheless be able to slip through upon each other when undue reactive forces are created for instance by block abutments or in view of a spring break at the connecting rod 11.

If, however, in special cases it is important under all circumstances to maintain a non-rotatable connection between the crank disc 2a and the clamping disc 6 in the clamping condition of the cam 10, this can easily be realized by ribs or teeth between the crank disc and the clamping disc. Such ribs or teeth between these parts lead to a slightly deep engagement so that in loosened condition of the clamping cam 10, these parts can disengage each other. The movement of the pressure plate 8 on the adjusting and clamping axle 7 on the left side of the drawing is in the illustrated embodiment limited by a conical ring 14. This ring prevents that the pressure plate 8 which has its circumference designed correspondingly, will be able in relaxed condition of the cam 10 to slip entirely off the adjusting and clamping axle 7. Furthermore, in the illustrated embodiment there is provided an arresting nose 15 which cooperates with depressions on the one side end face of the clamping disc 6. This nose 15 determines the adjusting possibility of the clamping disc 6 relative to the eccentric disc 2a with regard to discreet positions.

It is, of course, to be understood that the present invention is, by no means, limited to the specific showing of the drawings, but also comprises any modifications within the scope of the appended claims.

What is claimed is:

1. A crank gear with adjustable crank radius for motor driven beating, working implements, especially tamping implements, jack hammers and hammer drills which includes: a housing, a crank shaft rotatably journalled in said housing, said crank shaft having a first end section and an axially oppositely located second end section, a crank disc connected to said first end section for rotation therewith and having an outer periphery provided with teeth, driving gear means meshing with said teeth and drivingly connectable to a prime mover for rotating said crank disc, a rotatable member associated with said crank disc and operable to move into a first position for engagement with said crank disc and also operable to move into a second position for disengagement from said crank disc, a crank pin mounted on said rotatable member for connection to a connecting rod, said rotatable member having an axis of rotation eccentrically arranged with regard to the axis of rotation of said crank disc, and control means associated with said second end section and operatively connected to said rotatable member for selectively moving the same into said first position or into said second position, said control means including spring means urging said rotatable member into said first position, that end face of said crank disc which faces away from said second end section being provided with a truncated cone-shaped recess the extension of which has the extension of its axis eccentrically located with regard to the longitudinal axis of said crank shaft, and said rotatable member being in the form of a truncated cone-shaped clamping disc conforming in shape to said truncated cone-shaped recess.

2. A crank gear according to claim 1, in which said rotatable member includes means being arrestable in a plurality of adjusted positions for coupling with said crank disc.

3. A crank gear according to claim 1, in which said crank shaft has a longitudinal bore extending all the way through said crank shaft and having its axis axially aligned with the axis of said truncated cone-shaped recess and extending substantially parallel to the longitudinal axis of said crank shaft, and a control member movably arranged in said bore and connected at said first end section to said truncated cone-shaped disc and projecting beyond said second end section so as to form a cantilever section for manual operation.

4. A crank gear according to claim 3, in which said housing adjacent said second end section is provided with a cover adapted to be moved in a position for affording access from the outside to said control member.

5. A crank gear according to claim 4, which includes means for holding said cover in its closed position, said means being detachable from said cover and being insertable into said cam member for actuating the latter.

6. A crank gear according to claim 3, in which said cantilever section has pivotally connected thereto a cam member, and in which between said cam member and the adjacent end of said crank shaft there are arranged a pressure disc adjacent said cam member and said spring means interposed between said pressure disc and the adjacent end of said crank shaft, said cam member being movable into a first position for engaging said rotatable member with said crank disc and also being movable into a second position for disengaging said rotatable member from said crank disc.

7. A crank gear according to claim 6, which includes means operable in said second position of said cam member to establish an additional frictional connection between said crank disc and said rotatable member.

8. A crank gear according to claim 3, in which the inner peripheral surface of said recess and the outer peripheral surface of said rotatable member are smooth, and the spring means between said pressure disc and said crank disc continuously urges said rotatable member into engagement with the inner periphery of said recess, said spring means being such as to allow said rotatable member in engagement with the inner periphery of said recess to move relative to each other in response to the force acting by said crank pin on said rotatable member exceeding a predetermined value.

9. A crank gear with adjustable crank radius for motor driven beating working implements, especially tamping implements, jack hammers, and hammer drills, which includes: a housing, a crank shaft rotatably journalled in said housing, said crank shaft having a first end section and an axially oppositely located second end section, a crank disc connected to said first end section for rotation therewith and having an outer periphery provided with teeth, driving gear means meshing with said teeth and drivingly connectable to a prime mover for rotating said crank disc, that end face of said crank disc which faces away from said second end section being provided with a truncated cone-shaped recess having the extension of its axis eccentrically located with regard to the longitudinal axis of said crank shaft, said crank shaft having a longitudinal bore extending all the way through said crank shaft and having its axis axially aligned with the axis of said truncated cone-shaped recess and extending substantially parallel to the longitudinal axis of said crank shaft, a clamping disc corresponding in shape to the shape of said recess and axially displaceably arranged therein, a crank pin eccentrically arranged on said clamping disc for engagement with a connecting rod, a control member connected at said first end section to said clamping disc and projecting beyond said second end section so as to form a cantilever section, a pressure plate slidably supported by said cantilever section, spring means interposed between said pressure plate and said first end section for urging said pressure plate away from said second section to thereby rotatably couple said pressure plate to said crank disc, and cam means pivotally connected to said cantilever section and operable into a first position against the thrust of said spring means to move said clamping disc in a direction away from said crank disc for disengaging said clamping disc from said crank disc and permitting rotary movement of said control member and thereby of said crank pin on said clamping disc to the desired distance from the axis of rotation of said crank disc, said cam means also being movable into a second position for again making said spring means effective to couple said clamping disc ridgidly to said crank disc and arresting said crank pin in its respective externally determinable position on said clamping disc.

* * * * *